U. West & N. Thompson Jr,
Pipe Coupling,
N° 5,651.  Patented June 27, 1848.
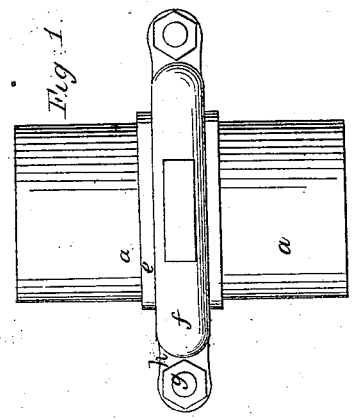
Fig. 1.
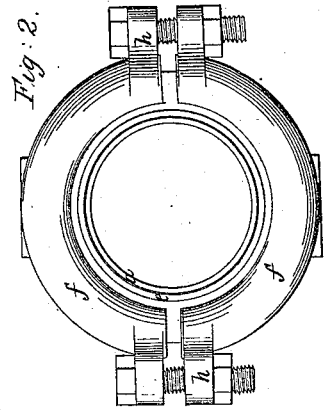
Fig. 2.
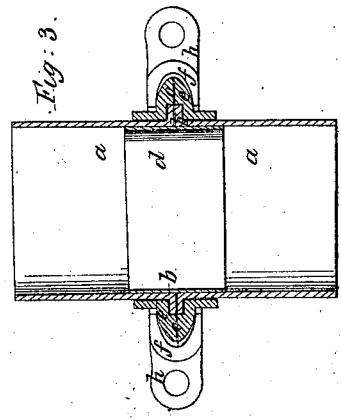
Fig. 3.
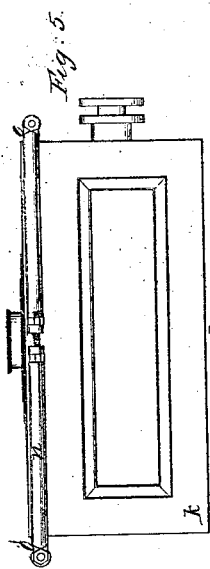
Fig. 5.
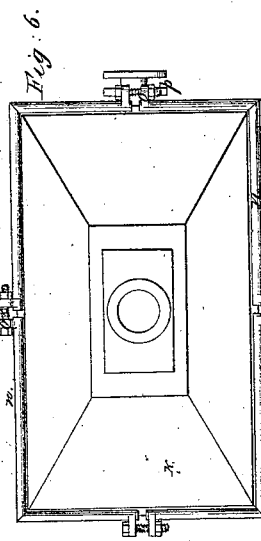
Fig. 6.
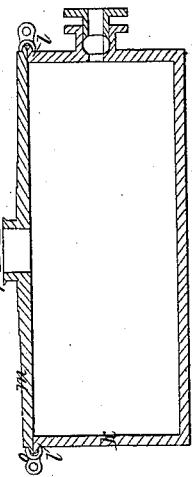
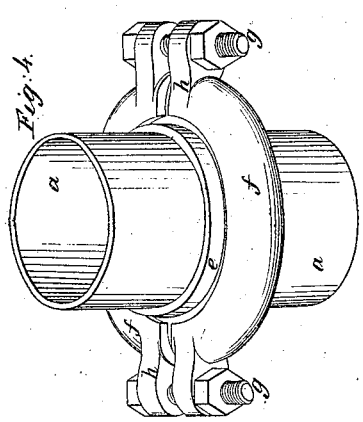
Fig. 4.
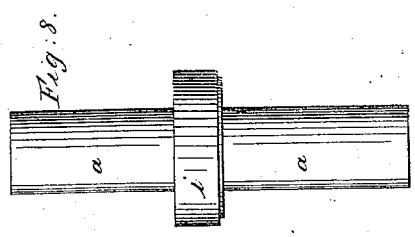
Fig. 8.
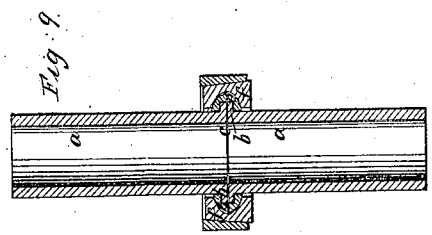
Fig. 9.
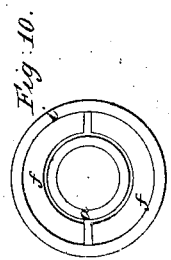
Fig. 10.

UNITED STATES PATENT OFFICE.

UEL WEST AND NATHAN THOMPSON, JR., OF NEW YORK, N. Y.

COUPLING FOR PIPES.

Specification of Letters Patent No. 5,651, dated June 27, 1848.

*To all whom it may concern:*

Be it known that we, UEL WEST and NATHAN THOMPSON, Jr., of the city, county, and State of New York, have invented new and useful improvements in coupling-joints for uniting pipes, shafts, nozzles, stop-cocks, bonnets, cylinder-heads, caps, and other conduits or vessels for conducting and containing fluids, &c., called the "clasp coupling-joint," and that the following is a full, clear, and exact description of the principle or character which distinguishes them from all other things before known and of the manner of making, constructing, and using the same, reference being had to the accompanying drawings, making part of this specification, in which—

Figures 1, 2, 3, and 4, represent respectively an elevation, plan, vertical section, and perspective view of our improved clasp coupling as applied to the coupling of pipes; Figs. 5, 6, and 7, are an elevation, plan, and vertical section of our invention as applied to the securing of a cap plate onto a quadrangular vessel; and Figs. 8, 9, and 10, represent respectively an elevation, vertical section, and plan of a modification of our invention as applied to the coupling of small pipes.

In all the figures corresponding parts are indicated by the same letters.

The principle or character of our invention which distinguishes it from all other things before known consists in forcing together the two bodies to be coupled or connected by means of a grooved segmental clamp the groove of which embraces flanches (or their equivalent) projecting from or connected with the bodies to be coupled, so that when the said segments are drawn together by screw bolts, keys, conical wedge rings or any equivalent means the groove therein shall act on the said flanches or their equivalents to force them together and thus make a tight joint with or without interposed packing.

In Figs. 1, 2, 3, and 4 of the accompanying drawings (*a, a*) represent two sections of a steam pipe, each provided with a turned or upset flanch (*b*), with packing (*c*) of any kind interposed; but if desired the packing can be dispensed with by facing the flanches or making what is termed a ground joint. At the junction of the two pipes an inner pipe or sleeve (*d*) is introduced within the pipe to serve as a guide in joining the flanches together, but this may be dispensed with if desired. Over the two sections of the pipe and extending over the flanches are two rings (*e, e*), one for each section, the inner faces of which correspond, or nearly so, with the faces of the two flanches, and having their outer faces curved or beveled; these rings should be made to fit somewhat closely onto the sections of pipe, or may be shrunk on if desired. When the two flanches and embracing rings are put together face to face they are embraced by a segmental clamp (*f, f*) made in two parts the inner periphery of which is grooved to embrace the rings (*e, e*) and to act on the outer curved or beveled faces thereof so that when the said segments are drawn together by means of screw bolts (*g, g*) that pass through ears (*h, h, h, h*) that project from their ends, the sides of the groove act in a wedge-like manner on the outer curved or beveled faces of the rings (*e, e*) to force them and the flanches of the sections of the pipe together and there hold them firmly. In this way it will be seen that the flanches are forced and held together around the entire circumference by the use simply of two bolts thus effecting a better joint which can be connected and disconnected in less time and held with more strength than by the means heretofore employed.

Instead of forcing together the segments of the clamp by means of screw bolts as above described this can be done by means of a ring (*i*), as represented in Figs. 8, 9, and 10, the inner periphery of which is made conical that it may be driven onto the segmental clamp, the outer periphery of which is made of a corresponding conical form. In these figures the parts corresponding with those represented in the figures above described are indicated by the same letters. The conical clamping ring for forcing together the segments of the clamp ring as a substitute for the clamp screws we have essayed for coupling small water and gas pipes and find it to answer a good purpose, but this modification will also be found to answer for coupling large pipes and other articles. Instead of the clamp screw-bolts or conical rings, keys or other modes of drawing or forcing together the segments of the grooved clamp may be substituted.

The rings (e, e) that extend over the flanges may be dispensed with and the grooved segmental clamp be made to act directly on the flanges, but we prefer to use the said rings as they can be more readily adapted to the groove of the segmental clamp, and at the same time give strength and support to the flanges, which in general are formed by turning over and upsetting the metal of the pipe.

If desired packing of any kind may be interposed between the flanges and the rings, but this in general will not be found necessary. Care should be taken to have the groove in the segmental clamp of greater depth than the projection of the flanges and rings, to give ample room for drawing together the segments, and it should also be observed to have the curve or bevel of the outer face of the rings, or of the flanges when rings are not used, of greater or less curve or bevel than the groove of the segmental clamp that in forcing together the segments the groove may act in the manner of a double wedge to force together the rings or flanges; and we prefer to make the curve or bevel of the groove more acute than the faces of the rings or flanges that in wedging on, the sides of the groove may act on the rings or flanges nearer to the periphery of the pipe than would be the case if this state of things were reversed.

Our improved coupling is equally applicable to the coupling of the parts of angular articles, and an example of this is given in Figs. 5, 6, and 7 of the accompanying drawings, which represent a mode of attaching or coupling the cap onto a quadrangular vessel. In these figures the upper edge of the vessel (k) is provided with a projecting flanch (l) with the under face rounded or beveled, and the upper edge of the cap plate (m) is similarly rounded or beveled to correspond therewith, and these when put together either with a close fitting ground joint, or with packing interposed, receive the grooved segmental clamp (n) which is made in four parts, each part fitted to one of the angles of the vessel, and these segments which are provided with projecting ears (o, o), are then drawn together by means of screw bolts (p) and thus couple and bind together the vessel and its cap, making a close tight joint entirely around. Instead of uniting the segments at the four faces of the square, they may be united at the angles. It will be clearly seen from this example that our improved coupling is applicable to vessels and other articles of angular or curved faces, and that whatever may be the form, any desired and effective mode of drawing or forcing together the segments of the grooved clamp may be substituted for screw bolts or the conical ring.

In coupling angular vessels or other articles it will be found to be advantageous to make the grooved clamp in as many sections as there are sides to the figure, and for round couplings it will be found sufficient to make it in two parts for all articles of moderate size; but when the diameter is very considerable it may be divided into three or more parts.

Our improved mode of coupling is equally applicable to the securing of nozzles, stopcocks, bonnets, and many other articles not necessary to enumerate, and particularly to cylinder heads, in which the edge of the head takes the place of one of the flanches.

It will be obvious to any engineer or machinist from the foregoing that shafts and other solid bodies can be coupled together in the same manner as hollow conduits or vessels, and with equal advantage and by a similar arrangement of parts, and therefore it is deemed unnecessary to give an example.

The flanches, instead of being solid projections of the bodies to be united, may be made separate and connected therewith in any manner desired, as the mode of making the flanches makes no part of our invention.

The leading advantages of our mode of coupling over the double flanch and bolts heretofore and now generally used are a great reduction in the number of screw bolts used which occupy much time in connecting and disconnecting joints, particularly in the parts of steam engines, such as the cylinder heads and other parts which require to be frequently connected and disconnected for packing and other purposes; and increased strength and more perfect and continuous support as the flanches by our plan instead of being reduced in strength by the numerous bolt holes are pressed together and supported all around by the grooved segmental clamp, and the strain on the threads of the screw bolts instead of being in the line of the force which tends to separate the coupling, as in the old plan, is nearly at a right angle therewith and therefore greatly relieved; there are other advantages which we deem unnecessary to enumerate.

Having thus described our invention and the manner of constructing and using the same, and stated the leading purposes to which it is applicable, together with the various modes in which we have so far con- templated the application of the principle thereof, what we claim as our invention, and desire to secure by Letters Patent, is—

The method, substantially as herein described, of coupling joints by means of flanches or their equivalents in combination with a grooved segmental clamp, the groove of which is formed to embrace the flanches, and which when drawn or forced together by screw bolts or other equivalent means, will force and hold together the flanches, substantially as herein described.

UEL WEST.
NATHAN THOMPSON.

Witnesses:
JOHN FARRON, Jr.,
WILLIAM SEWELL, Jun.,
JOHN C. THOMPSON.